(12) United States Patent
Hessmert et al.

(10) Patent No.: US 6,588,263 B2
(45) Date of Patent: Jul. 8, 2003

(54) ARRANGEMENT AND METHOD FOR DETERMINING THE TEMPERATURE OF VALVES

(75) Inventors: Ulrich Hessmert, Schwieberdingen (DE); Jost Brachert, Ditzingen (DE); Thomas Sauter, Remseck (DE); Helmut Wandel, Markgroeningen (DE); Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/016,770

(22) Filed: Oct. 26, 2001

(65) Prior Publication Data

US 2002/0088272 A1 Jul. 11, 2002

(30) Foreign Application Priority Data

Oct. 28, 2000 (DE) .......................... 100 53 607

(51) Int. Cl.[7] .............................. G01M 15/00
(52) U.S. Cl. .......................... 73/121; 73/128
(58) Field of Search .................. 73/121, 128, 129; 303/3, 7, 15, 113.2, 115.4

(56) References Cited

U.S. PATENT DOCUMENTS

| | | | | |
|---|---|---|---|---|
| 5,169,215 A | * | 12/1992 | Takata | 303/113.4 |
| 5,255,962 A | * | 10/1993 | Neuhaus et al. | 303/111 |
| 5,294,190 A | * | 3/1994 | Feldmann et al. | 303/3 |

* cited by examiner

*Primary Examiner*—Vinh P. Nguyen
*Assistant Examiner*—Monica D. Harrison
(74) *Attorney, Agent, or Firm*—Kenyon & Kenyon

(57) ABSTRACT

An arrangement for determining the temperature of valves in the brake circuit of a vehicle is described. The arrangement includes an arrangement to measure a longitudinal wheel force, an arrangement to determine a wheel braking pressure using the measured longitudinal wheel force, an arrangement to determine a pressure drop across a valve using the wheel braking pressure, an arrangement to determine a valve solenoid current using the pressure drop, an arrangement to determine the resistance of the valve solenoid from the valve solenoid current and an applied valve solenoid voltage, and an arrangement to determine the valve solenoid temperature using the temperature-dependence of the valve solenoid resistance. Moreover, a method for determining the temperature of valves in the brake circuit of a vehicle is provided.

14 Claims, 1 Drawing Sheet ial and METHOD FOR
DETERMINING THE TEMPERATURE OF
VALVES

FIELD OF THE INVENTION

The present invention relates to an arrangement for determining the temperature of valves in the brake circuit of a vehicle. Moreover, the present invention relates to a method for determining the temperature of valves in the brake circuit of a vehicle.

BACKGROUND INFORMATION

In order to increase the driving safety of motor vehicles, controlled systems are being used with increasingly greater frequency. Such controlled systems are, for example, the antilock braking system (ABS), the traction control system (TCS) and the electronic stability program (ESP). These systems influence the brake circuit of motor vehicles via the control of valves.

To an increasing degree, valves which are operated linearly are used for hydraulic units in which the named systems are installed. In linear solenoid valves (LSV), the linearly adjustable pressure drop across the valve having a specific and essentially known function is a function of the valve solenoid current. Therefore, the pressure drops across the valves can be adjusted in the desired manner by a suitable adjustment of the solenoid current.

In Δp control or CPC control (continuous pressure control), for example, the wheel braking pressure is adjusted by adjusting a pressure drop in one valve. For example, the wheel braking pressure with a completely open inlet valve (EV) of the wheel brake cylinder can be adjusted by adjusting the pressure drop via a changeover valve (USV) of the brake circuit. Likewise, it is possible to influence the wheel braking pressure by adjusting the pressure drop via the inlet valve of the wheel brake cylinder and to adjust it in conjunction with the pressure drop across the changeover valve.

However, when a pressure drop is adjusted via a valve using the relationship between the pressure drop and the valve solenoid current, it is a problem that the resistance of the valve solenoid is strongly dependent on the solenoid temperature. Accordingly, when a specific valve solenoid voltage is adjusted, the valve solenoid current and consequently the pressure drop are strongly temperature-dependent.

This problem can be confronted, for example, by using current-controlled output stages for the valve control. It is also possible to measure the temperature on the valve solenoids or on the hydraulic unit using a solenoid temperature model. It has also been proposed that the external temperature be measured using a temperature model for the hydraulic unit to determine the temperature of the solenoids. However, these devices are complex and cost-intensive due, for example, to the use of current-controlled output stages.

SUMMARY

In accordance with an example embodiment of the present invention, an arrangement is provided to measure a longitudinal wheel force, an arrangement is provided to determine a wheel braking force using the measured longitudinal wheel force, an arrangement is provided to determine a pressure drop across a valve using the wheel braking force, an arrangement is provided to determine a valve solenoid current using the pressure drop, an arrangement is provided to determine a resistance of the valve solenoid from the valve solenoid current and an applied valve solenoid voltage, and an arrangement is provided to determine the valve solenoid temperature using the temperature dependence of the valve solenoid resistance. The longitudinal wheel force can be measured in a simple manner by conventional sensors. Thus, a measured quantity is available from which the solenoid temperature can be calculated. Overall, this is a more cost-effective device.

The valve may be a changeover valve. It is then particularly useful to measure the solenoid temperature of the changeover valve if the changeover valve is used to adjust the wheel braking pressure. In the case of CPC control, it is possible to determine the wheel braking pressure in the wheel with the higher wheel braking pressure in the brake circuit by adjusting the changeover valve. Since the relationship between a pressure drop across the changeover valve and the electrical changeover valve solenoid current is known, the valve solenoid current can be calculated from the longitudinal wheel force. By applying Ohm's law, it is possible to calculate the solenoid resistance from the valve solenoid current and the adjusted valve solenoid voltage and from it, it is possible to calculate the changeover valve solenoid temperature with the aid of the known temperature dependence of copper wire (resistance).

However, it may also be useful if the valve is an inlet valve. The inlet valve is used to adjust the wheel braking pressure in the wheel with the lower pressure in the brake circuit. In this wheel, the wheel braking pressure is equal to the pressure drop across the changeover valve reduced by the pressure drop across the inlet valve.

In one embodiment, an arrangement is provided to determine the relationship between the valve solenoid voltage and the wheel braking pressure from the valve solenoid temperature. In the final analysis, such a precise relationship can be produced between the valve solenoid voltage and the wheel braking force, which enhances the accuracy of the control.

It may also be of advantage to provide an arrangement to determine the hydraulic unit temperature from the valve solenoid temperature via a temperature model using additional parameters. The temperature of the hydraulic unit may be of interest for numerous questions in connection with the influencing of the brake circuit, for example, with respect to the allowable temperature limits.

It may also be an advantage to provide an arrangement to determine the hydraulic unit temperature from the valve solenoid temperature via a temperature model using the heat capacity and thermal conductivity of involved components. With a suitable temperature model, it is thus possible to determine the hydraulic unit temperature using the named variables.

In one embodiment, an arrangement is provided to compensate for the viscosity of the brake fluid as a function of the hydraulic unit temperature using the determined hydraulic unit temperature. This has advantages, for example, with respect to the rate of the pressure buildup and to improve the control characteristics.

According to an example embodiment of the present invention, a longitudinal wheel force is measured, a wheel braking force is determined using the measured longitudinal wheel force, a pressure drop across a valve is determined using the wheel braking force, a valve solenoid current is determined using the pressure drop, a resistance of the valve solenoid is determined from the valve solenoid current and an applied valve solenoid voltage, and the valve solenoid temperature is determined using the temperature-dependence of the valve solenoid resistance. The longitudinal wheel force can be measured in a simple manner by conventional sensors. Thus, a measured quantity is available from which the solenoid temperature can be calculated. Overall, this is a more cost-effective device.

The valve may be a changeover valve. It is then particularly useful to measure the solenoid temperature of the changeover valve if the changeover valve is used to adjust the wheel braking pressure.

It may also be advantageous if the valve is an inlet valve. The inlet valve is used to adjust the wheel braking pressure in the wheel with the lowest pressure in the brake circuit. In this wheel, the wheel braking pressure is equal to the pressure drop across the changeover valve reduced by the pressure drop across the inlet valve.

In one embodiment, the relationship between the valve solenoid voltage and the wheel braking pressure is determined from the valve solenoid temperature. In the final analysis, such a precise relationship can be produced between the valve solenoid voltage and the wheel braking force, which enhances the accuracy of the control.

It may also be useful if hydraulic unit temperature is determined from the valve solenoid temperature via a temperature model using additional parameters. The temperature of the hydraulic unit may be of interest for numerous questions in connection with the influencing of the brake circuit, for example, with respect to the allowable temperature limits.

It may be advantageous if the hydraulic unit temperature is determined from the valve solenoid temperature via a temperature model using the heat capacity and thermal conductivity of involved components. With a suitable temperature model, it is thus possible to determine the hydraulic unit temperature using the named variables.

Also, the hydraulic unit temperature may be used to compensate for the viscosity of the brake fluid as a function of hydraulic unit temperature. This has advantages, for example, with respect to the rate of the pressure buildup and to improve the control characteristics.

According to the present invention, the temperature of one valve solenoid can be measured in a simple manner by measuring the longitudinal wheel force. The temperature of the valve solenoid and, in a preferred embodiment, of the total hydraulic unit, can be determined and used in manifold ways. The present invention makes it possible to reduce costs since, in particular, no current-controlled valve output stages are required.

DETAILED DESCRIPTION

Figure 1:
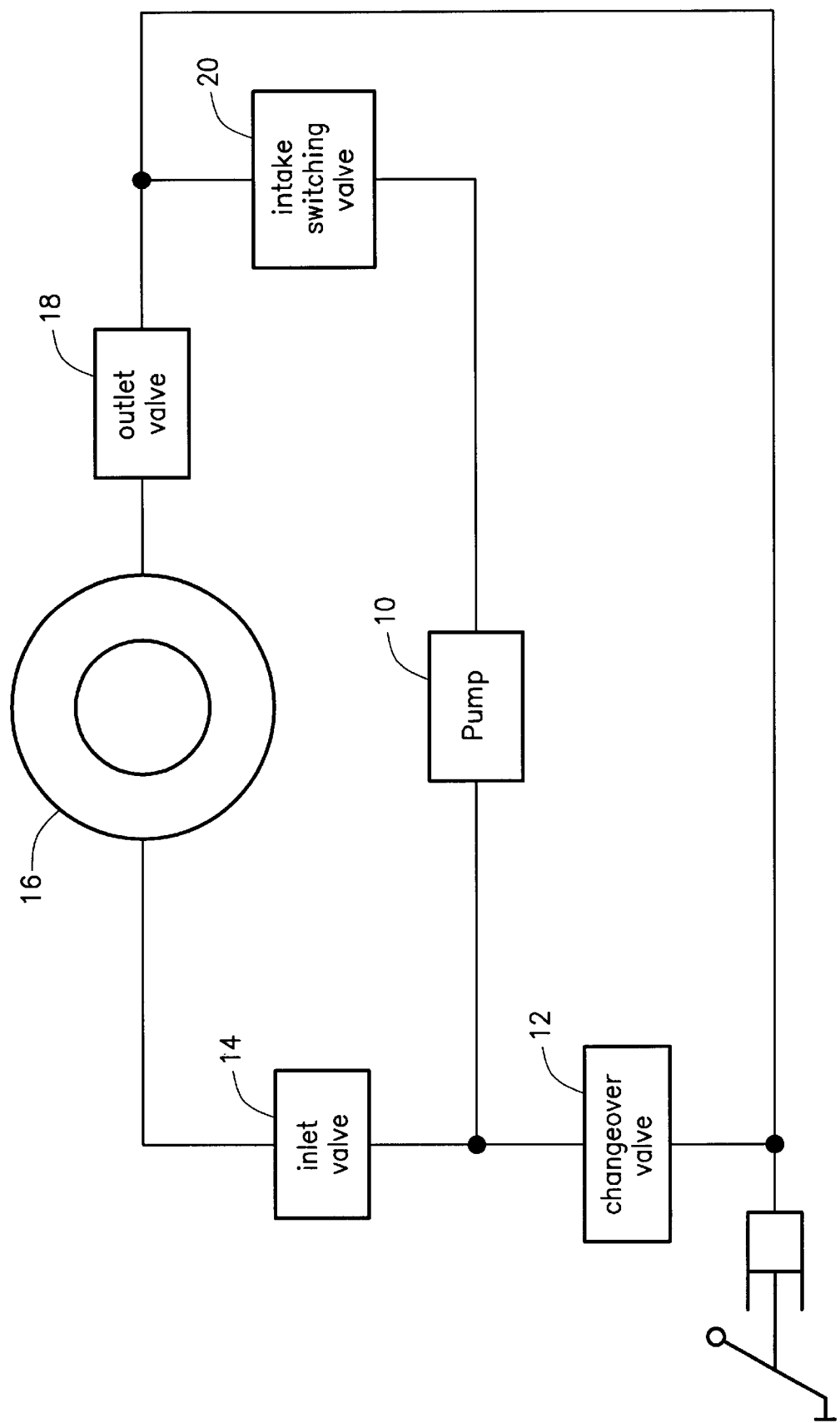
FIG. 1 shows a diagram of a part of a brake circuit.

FIG. 1 shows a diagram of a part of the brake circuit. A pump 10 is connected to the brake master cylinder via a changeover valve 12 (USV) and to the wheel cylinder of a wheel 16 via an inlet valve 14 (EV). The circuit is closed via an outlet valve 18 (AV) and an intake switching valve 20 (ASV).

With a $\Delta p$ control (CPC; continuous pressure control), the wheel braking pressure in wheel 16 is adjusted with the higher braking pressure in the brake circuit by the pressure drop across changeover valve 12. During the entire duration of the control, intake switching valve 20 is open. Inlet valve 14 of the wheel with the higher wheel braking pressure in the brake circuit is always open. Outlet valve 18 of this wheel is always closed.

If wheel 16 is the wheel with the lower braking pressure of the brake circuit, the wheel braking pressure is adjusted with the linear pressure drop via inlet valve 14 of this wheel. In this case, the wheel braking pressure is equal to the difference between the pressure drop across changeover valve 12 and the pressure drop across inlet valve 14.

Both valves, changeover valve 12 as well as inlet valve 14 are thus used for the control of the wheel braking pressure. Thus, the present invention can be used advantageously for determining the temperature in both changeover valve 12 and inlet valve 14.

Initially, the wheel with the higher wheel braking pressure is considered. In this wheel, the wheel braking pressure is equal to the pressure drop across changeover valve 12. Since the relationship between the pressure drop across changeover valve 12 and the electrical solenoid current of the changeover valve is known, it is possible to calculate the valve solenoid current of changeover valve 12 from the longitudinal wheel force in the case of $\Delta p$ control. By applying Ohm's law, it is possible to calculate the solenoid resistance from the valve solenoid current of changeover valve 16 and the adjusted valve solenoid voltage, and with it, it is possible to calculate the solenoid temperature of changeover valve 12 with the aid of the known temperature-dependence of copper wire (resistance).

Similar considerations apply to the wheel with the lower wheel braking pressure. Again, the wheel braking pressure is inferred from the longitudinal wheel force which is measured with a sensor. The wheel braking pressure of the wheel with the lower wheel braking pressure in the brake circuit is controlled with the pressure drop via inlet valve 14 with $\Delta p$ control. The wheel braking pressure is equal to the pressure drop across changeover valve 12 less the pressure drop across inlet valve 14. From the relationship between the longitudinal wheel force, pressure drop across changeover valve 12 and the pressure drop across inlet valve 14, it is possible to calculate the valve solenoid current of inlet valve 14. By applying Ohm's law, it is possible to calculate the solenoid resistance from the valve solenoid current of changeover valve 14 and the adjusted valve solenoid voltage, and in turn, it is possible to calculate the solenoid temperature of the inlet valve with the aid of the known temperature-dependence of copper wire (resistance).

The preceding description of the exemplary embodiments of the present invention serves only the purpose of illustration and not to limit the invention. Various changes and modifications are possible in the context of the invention without departing from the scope of the present invention and its equivalents.

What is claimed is:

1. An arrangement for determining a temperature of a valve in a brake circuit of a vehicle, comprising:
    a first arrangement configured to measure a longitudinal wheel force;
    a second arrangement configured to determine a wheel braking pressure using the measured longitudinal wheel force;
    a third arrangement configured to determine a pressure drop across a valve using the wheel braking pressure;
    a fourth arrangement configured to determine a valve solenoid current using the pressure drop;
    a fifth arrangement configured to determine a resistance of a valve solenoid from the valve solenoid current and an applied valve solenoid voltage; and a sixth arrangement configured to determine the valve solenoid temperature using a temperature-dependence of the resistance of the valve solenoid.

2. The arrangement according to claim 1, wherein the valve is a changeover valve.

3. The arrangement according to claim 1, wherein the valve is an inlet valve.

4. The arrangement according to claim 1, further comprising:

a seventh arrangement configured to determine a relationship between the valve solenoid voltage and the wheel braking pressure from the valve solenoid temperature.

5. The arrangement according to claim 1, further comprising:

a seventh arrangement configured to determine a hydraulic unit temperature from the valve solenoid temperature via a temperature model using additional parameters.

6. The arrangement according to claim 1, further comprising:

a seventh arrangement configured to determine a hydraulic unit temperature using a heat capacity and a thermal conductivity of involved components.

7. The arrangement according to claim 1, further comprising:

a seventh arrangement configured to compensate for a viscosity of brake fluid as a function of the hydraulic unit temperature using the determined hydraulic unit temperature.

8. A method for determining a temperature of a valve in a brake circuit of a vehicle, comprising:

measuring a longitudinal wheel force;

determining a wheel braking pressure using the measured longitudinal wheel force;

determining a pressure drop across a valve using the determined wheel braking pressure;

determining a valve solenoid current using the determined pressure drop;

determining a resistance of the valve solenoid from the valve solenoid current and an applied valve solenoid voltage; and determining the valve solenoid temperature using a temperature-dependence of the resistance of the valve solenoid.

9. The method according to claim 8, wherein the valve is a changeover valve.

10. The method according to claim 8, wherein the valve is an inlet valve.

11. The method according to claim 8, further comprising:

determining a relationship between the valve solenoid voltage and the wheel braking pressure from the valve solenoid temperature.

12. The method according to claim 8, further comprising:

determining a hydraulic unit temperature from the valve solenoid temperature via a temperature model using additional parameters.

13. The method according to claim 8, further comprising:

determining a hydraulic unit temperature from the valve solenoid temperature via a temperature model using a heat capacity and a thermal conductivity of involved components.

14. The method according to claim 8, further comprising:

compensating for the viscosity of brake fluid as a function of hydraulic unit temperature.

* * * * *